United States Patent [19]

Jackson

[11] Patent Number: 4,692,242

[45] Date of Patent: Sep. 8, 1987

[54] SCREEN COMPRISING A TRAVELLING ENDLESS SCREENING BAND

[76] Inventor: Philip Jackson, 15 Rue Las Cases, 75007 Paris, France

[21] Appl. No.: 813,672

[22] Filed: Dec. 26, 1985

[30] Foreign Application Priority Data

Dec. 28, 1984 [FR] France ............... 84 20004

[51] Int. Cl.$^4$ ............................. B01D 33/04
[52] U.S. Cl. .................... 210/160; 160/348; 209/307; 210/400
[58] Field of Search ............ 210/160, 400, 401, 407, 210/409, 411, 412; 162/348; 209/307

[56] References Cited

U.S. PATENT DOCUMENTS 1,947,752 2/1934 Benesh ................... 299/121
4,374,736 2/1983 Jackson ................... 210/783

FOREIGN PATENT DOCUMENTS 0071442 2/1983 European Pat. Off. .
883594 7/1953 Fed. Rep. of Germany .
1061747 7/1959 Fed. Rep. of Germany .
1144691 3/1963 Fed. Rep. of Germany .
2477195 9/1981 France .

*Primary Examiner*—Frank Sever
*Attorney, Agent, or Firm*—Charles E. Brown; Charles A. Brown

[57] ABSTRACT

In a screen the screening band is formed by a plurality of screening panels linked to each other in succession substantially perpendicularly to the direction of movement of the assembly, the filtering element of a filtering panel of this kind forming, relative to the plane of the chassis that carries it, at least one part-cylindrical projection extending parallel to the direction of movement of the assembly. For each projection of this kind the washing manifold comprises two staggered nozzles, one oblique in one direction and the other oblique in the opposite direction.

19 Claims, 7 Drawing Figures

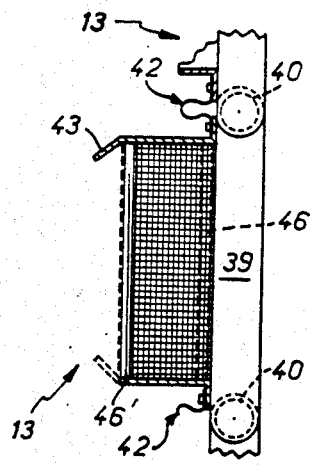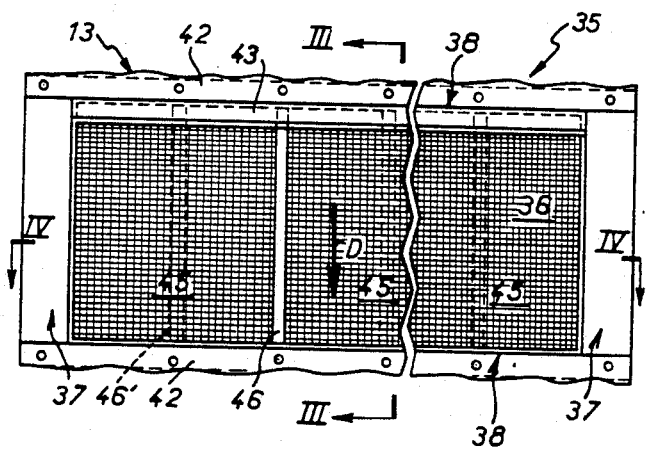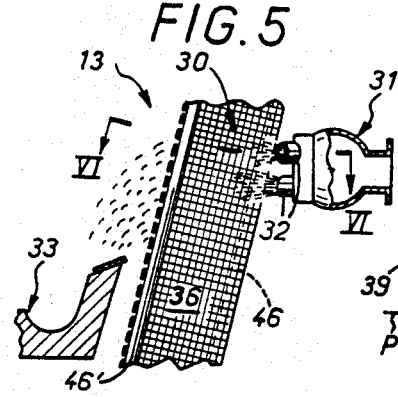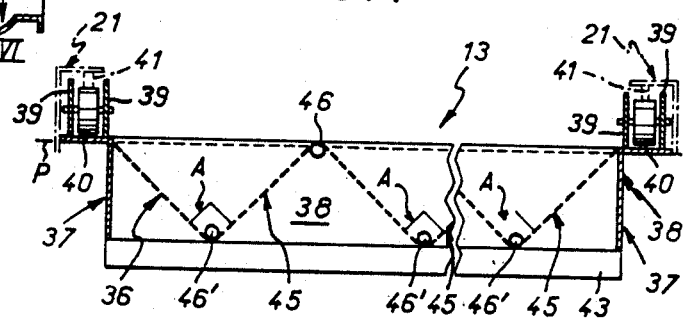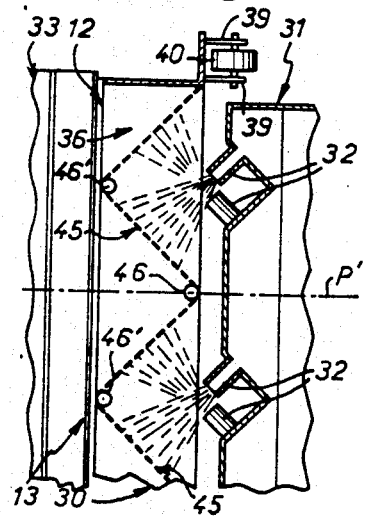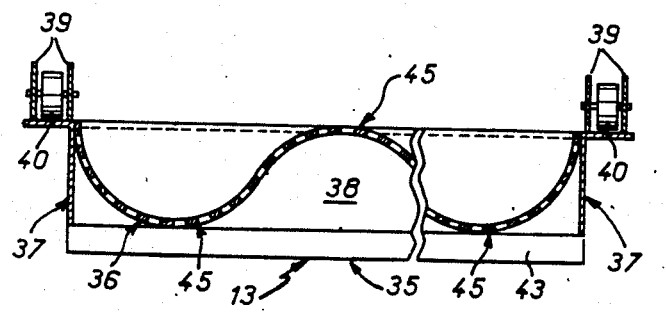

SCREEN COMPRISING A TRAVELLING ENDLESS SCREENING BAND

The present invention is generally concerned with screens comprising a travelling endless screening band and is more particularly directed to screens in which the screening band is formed by a plurality of screening panels linked to each other in succession substantially perpendicularly to the direction of movement of the assembly and where the water to be filtered is intended to pass through the screen from the outside towards the inside.

The screen may be, for example, a single flow (through flow) or double flow screen of the type usually called a chain screen, in which the screening panels making up the screening band are all articulated to each other in succession in the manner of the links of a chain, forming an elongate loop passing around at least one rotary drive member.

However, the screen may equally well be one of the type usually called drum screens in which the screening panels making up the screening band form part of a rigid cylinder mounted to rotate about its axis, the way in which these drum screens operate being overall the same as that of the aforementioned chain screens.

In both cases the direction in which the screening panels move is at right angles to the rotation axis of the rotary member used, which is the drive member in chain screens or the cylinder in drum screens, and by virtue of their movement in an endless loop the screening panels are alternately immersed in the water to be filtered and out of the water.

Generally speaking, each screening panel of the screening band of a screen comprising a travelling endless screening band of this type comprises a substantially plane chassis or frame and a screening element, screening fabric or perforated metal plate, carried by the chassis.

At present the screening element employed more often than not extends in the same plane as the chassis that carries it.

In the case of a screening fabric, for example, the fabric is stretched between the edges of the chassis.

The corresponding screening surface area is thus limited to that defined by the perimeter of the chassis.

To increase the screening capacity of a screen, in other words to increase the flowrate of water that can be passed through it, it is then necessary either to increase the width of the screening panels or to increase the number of screening panels immersed in the water to be filtered.

In both cases this results in a costly increase in the amount of equipment used and in the amount of civil engineering work involved.

In order to alleviate this difficulty it has already been proposed to increase the screening surface area of each screening panel, for the same chassis perimeter, by conferring on the screening element of a screening panel of this kind a configuration which is no longer plane but instead in the form of portions of a cylinder, the screening element then forming at least one projection relative to the plane on the chassis that carries it.

By the terms "cylinder" and "part-cylinder" as employed here is meant, in the usual way, a surface of which all the generatrices are parallel to each other, irrespective of the contour in transverse cross-section, which contour is not necessarily circular.

This is the case, for example, in German patent application No. 1.444.691, in which the projections in the screening elements extend parallel to the direction of movement of the assembly, their generatices being parallel to this direction.

However, in this German patent application, the water to be filtered passes through the screening band from the inside towards the outside and the nozzles of the washing manifold associated with and disposed on the outside of the screening band are all disposed at the same level, inserted deeply between the projections that the corresponding screening elements form.

Such nozzles would inevitably interfere with the supporting of the screening elements if the washing manifold were disposed inside the loop formed by the screening band, as is the norm when the liquid to be filtered must pass through the screening band from the outside towards the inside.

A general object of the present invention is an arrangement enabling this difficulty to be overcome in a case of this kind.

More precisely, the object of the present invention is a screen comprising a travelling endless screening band of the kind in which said screening band is formed by a plurality of screening panels which are all connected to each other in succession substantially perpendicularly to the direction of movement of the assembly and which each comprise a substantially plane chassis and a screening element carried by said chassis, said screening element forming, relative to the plane of said chassis, at least on part-cylindrical projection extending parallel to the direction of movement of the assembly, its generatrices being parallel to said direction of movement, characterized in that, the water to be filtered passing through the screening band from the outside towards the inside of the screen, and a washing manifold being provided, generally perpendicular to the direction of movement of the assembly, inside the loop formed by said screening band, with a plurality of nozzles, said nozzles are distributed in two staggered rows and certain are directed obliquely, in a first direction, relative to a longitudinal plane of the assembly parallel to said direction of movement whereas, relative to said longitudinal plane, the others are directed obliquely in the opposite direction so that, for each projection that the screening element of a screening panel forms, there is one nozzle oblique in a first direction and one nozzle oblique in the opposite direction.

By virtue of an arrangement of this kind, and in spite of the projecting configuration that a screening element of this kind has, the element may be efficaciously washed.

For this efficaciousness to be optimized it is important, on the one hand, that the washing jets used impinge on the screening elements to be cleaned at an angle of incidence that is as close as possible to the normal and, on the other hand, that the distance between corresponding nozzles and the screening elements remain within relatively narrow limits, of the order of approximately 8 to 22 centimeters, as is effectively possible with the arrangement in accordance with the invention.

Briefly, for a screen in which the water to be filtered passes through the screening band from the outside towards the inside, the arrangement in accordance with the invention offers the advantage of reconciling a high screening capacity with highly efficacious washing.

The characteristics and advantages of the invention will emerge from the following description given by way of example with the reference to the accompanying diagrammatic drawings in which:

FIG. 2 is a view in elevation of one of the screening panels that a screen of this kind comprises, seen in the direction of the arrow II in FIG. 1;

FIG. 3 is a view of this screening panel in transverse cross-section on the line III—III in FIG. 2;

FIG. 4 is a view of it in longitudinal cross-section on the line IV—IV in FIG. 2;

FIG. 5 is a view of the screen in accordance with the invention in longitudinal cross-section parallel to the direction of movement of the screening panels, in line with the associated washing manifold, generally on the line V—V in FIG. 1;

FIG. 6 is a partial view of it in transverse cross-section perpendicular to the direction of movement of the screening panels, generally on the broken line VI—VI in FIG. 5;

FIG. 7 is a view in longitudinal cross-section of a screening panel analogous to that of FIG. 4, for an alternative embodiment of the screening element of this screening panel.

Figure 1:
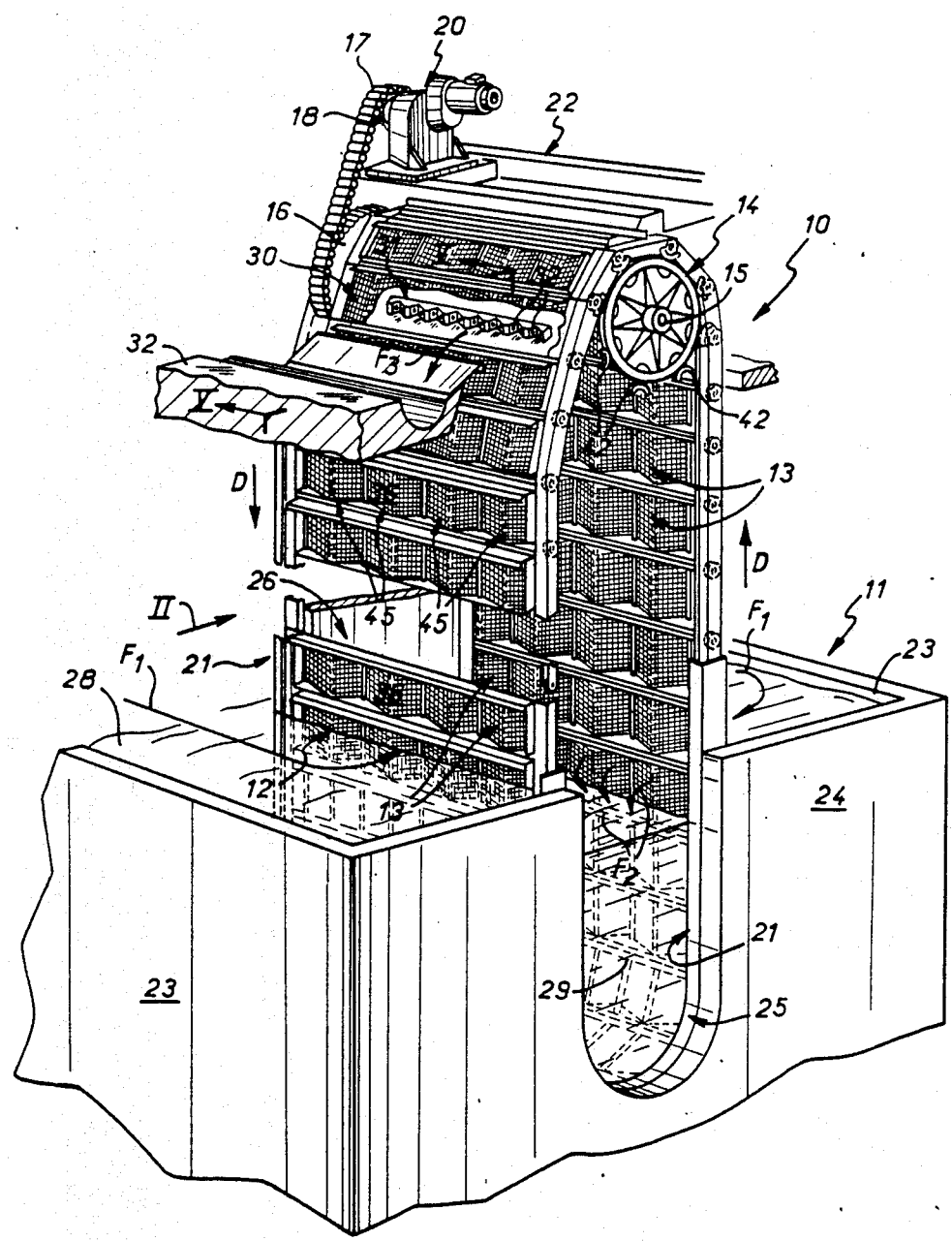
FIG. 1 is a partially cut away view in perspective of a screen in accordance with the invention.

These figures show by way of example the application of the invention to a chain screen 10, more specifically to a double flow chain screen 10.

The chain screen 10 is disposed generally vertically in a tank 11 supplied with water to be filtered, its bottom section being immersed in the tank.

Its screening band 12, which is of the travelling endless loop type, in practice forms a loop extending generally vertically.

Thus it has an upward run and a downward run.

For the main part at least of both these runs, the direction of movement is generally vertical.

The resulting endless travelling screening band 12 is formed by a plurality of screening panels 13, to be described in detail hereafter, all connected to each other in succession substantially perpendicularly to the direction of movement of the assembly.

In other words, these screening panels 13, all of which have a generally rectangular contour, all extend substantially perpendicularly to a vertical direction.

In practice, as this is a chain screen, the screening panels 13 are pivoted to each other in succession in the manner of the links of a chain.

In its upper part the loop that they form passes over a rotary drive member 14, the shaft 15 of which is, for example, keyed to a gearwheel 16 driven in rotation through the intermediary of a chain 17 and another gearwheel 18 from the output shaft of a drive motor-gearbox unit 20.

In the lower part, the sides of the loop are engaged with U-shaped fixed guides 21 of angle iron cross-section.

These fixed guides 21 form part, for example, of a framework not shown in detail here which rests on the bottom of the tank 11 and which, for example, carries the shaft 15 of the rotary drive member 14 and the platform 22 needed to support the drive motor-gearbox unit 20.

As this is a double flow chain screen, the screening band 12 extends generally parallel to the side walls 23 of the tank 11, spaced from both these, being applied by one of its edges, more precisely by the fixed guide 21 associated with that edge, against the transverse wall 24 closing off the tank 11 at its end.

A U-shape opening 25 matching the contour of the corresponding fixed guide 21 of the screening band 12 is formed in the transverse wall 24 of the tank 11.

Thus the space inside the screening band 12 communicates directly with the opening 25.

On the opposite side the internal volume is closed off by a closure plate 26 over that part at least of its height that corresponds to the depth to which the screening band 12 is immersed.

As schematically shown by the arrows F1 in FIG. 1, the water 28 to be filtered, confined by the side walls 23 of the tank 11, enters the internal volume of the screening band 12 laterally, passing from the outside towards the inside through both runs of the band and, as shown by the arrows F2 in FIG. 1, the filtered water 29 leaves it axially, through the opening 25 in the transverse wall 24 of the tank 11.

The resulting installation is completed by a washing station 30 disposed on the part of the screening band 12 that is not immersed, generally on the side of the downward run thereof.

In practice this washing station comprises a washing manifold 31 disposed inside the loop formed by the screening band 12 and extending generally parallel to the generatrices thereof and thus generally perpendicular to the direction of movement of the screening panels 13, with a plurality of nozzles 32 each adapted to spray a jet of pressurized water in the direction of the screening panel 13 moving past it.

Outside the loop formed by the screening band 12, slightly below the washing ramp 31, there is a trough 33 also extending generally parallel to the generatrices of the screening band 12 and therefore generally perpendicularly to the direction of movement of the screening panels 13, designed to collect, as shown by the arrow 3 in FIG. 3, any debris or detritus detached from the screening panels by the jets of pressurized water from the nozzles 32 of the washing manifold 31, in order to evacuate any such debris or detritus.

These arrangements are well known in themselves and as they do not of themselves form part of the present invention they will not be described in further detail hereafter, except in respect of those parts necessary to understanding the invention.

In the embodiment shown, and as is more clearly visible in FIGS. 2 through 4, each screening panel 13 comprises a substantially plane chassis 35 of rectangular contour and a screening element 36 carried by the chassis 35.

In practice the chassis 35 is made up by two longitudinal members 37 parallel to each other and to the direction of movement of the assembly and two crossmembers 38 parallel to each other and linking at right angles the aforementioned longitudinal members 37, in the manner of the edges of a frame.

In the embodiment shown the transverse cross-section of the longitudinal members 37 is in the shape of an angle iron and, on the backs of their coplanar sides, they carry two projecting flanges 39 between which are mounted rollers 40, one at each end.

These rollers 40 are common to two consecutive screening panels 13, their spindles linking these together, like the links of a chain.

They are intended to cooperate rolling fashion with rails 41 carried for this purpose by the fixed guides 21

(FIG. 4) and with shells 42 also carried for this purpose by the rotary drive member 14 (FIG. 1).

In the embodiment shown, the transverse cross-section of the crossmembers 38 is also in the shape of an angle iron.

They are appropriately attached to the longitudinal members 37, as by welding, for example.

In practice, their coplanar sides extend in the same plane as the coplanar sides of the longitudinal members 37.

For convenience, this plane will be considered here as defining the plane of the corresponding chassis 35.

For greater clarity this plane P has been shown in FIG. 4.

Between the coplanar sides of the crossmembers 38 there extend, from one screening panel 13 to the other, strips of flexible material 42 adapted to render the assembly watertight. In the case of at least one of the crossmembers 38, the side of the crossmember 38 which is perpendicular to the longitudinal members 37 is extended forwardly by a flap 43.

In the embodiment shown this corresponds to the downward run of the screening band 12, only the upper crossmember 38 of each screening panel 13 forming a flap 43 of this kind, this flap 43 extending generally obliquely downwards.

However, as schematically shown in chain-dotted line in FIG. 3, it is obvious that a flap 43 of this kind may be provided on each of the crossmembers 38 and/or that its configuration may be different.

Once again these are arrangements which are well known in themselves and, lying within the competence of those skilled in the art, they will not be described in more detail here.

As shown, the screening element 36 of each screening panel 13 forms at least one projection 45 relative to the plane P of the frame 35 that carries it, this part-cylindrical projection 45 extending parallel to the direction of movement of the assembly, its generatrices being parallel to said direction of movement.

For greater clarity this direction of movement is schematically represented by an arrow D in FIG. 2, in relation to the downward run of the screening band 12.

It is also schematically represented by an arrow D in FIG. 1 for both runs of the screening band 12.

In the embodiment shown the screening element 36 forms a number of projections 45 disposed side by side, each being part-cylindrical and extending parallel to the direction of movement D.

In practice, each of the projections 45 is of generally dihedral configuration.

In the embodiment shown, the aperture angle A of a dihedron of this kind is substantially 90° (FIG. 4).

In practice the screening element 36 consists of a screening fabric, for example, and there are provided between the crossmembers 38 of the chassis 35 carrying the screening elements 36 bars 46, 46' disposed in two parallel rows, a row of bars 46 along the edge of the crossmembers 38 that lies in the corresponding plane P and a row of bars 46' along the opposite edge of the crossmembers 38, with a relative offset between these rows, and the screening fabric constituting the screening element 36 is run alternately around the bars 46, 46' in alternate rows, being retained at the ends by the longitudinal members 37 in the plane P.

In accordance with the invention, the nozzles 32 of the washing manifold 31 are disposed in two staggered rows and relative to a longitudinal plane of the assembly parallel to the direction of movement D, as schematically represented by the chain-dotted line P' in FIG. 6, for example, certain of these nozzles 32 are directed obliquely in a first direction whereas the others are directly obliquely in the opposite direction.

In practice, in the embodiment shown, the nozzles 32 in the same row are all oblique in the same direction.

Be this as it may, for each projection 45 formed by the screening element 36 of a sceening panel 13, there is thus one nozzle 32 oblique in a first direction and one nozzle oblique in the opposite direction.

By virture of the staggered arrangement, the jets sprayed by these nozzles do not interfere with each other.

In practice, the two nozzles 32 associated in this way with each projection 45 of the screening element 36 of the screening panel 13 define between them an angle which reflects that of the dihedron which a projection 45 of this kind itself forms.

Thus in practice in the embodiment shown this angle is 90°.

In this way each nozzle 32 is relevant to one of the sides of a dihedron of this kind, so that its effectiveness is as high as may be required.

As is easy to demonstrate, when as in this instance the aperture angle A of the dihedra that the projections 45 of a screening element 36 form is equal to 90°, the screening surface area of each screening panel 13 is increased by 41% relative to that defined by the perimeter of its frame 35 only.

If the aperture angle A is changed to 60°, then the screening surface area is doubled.

Any other aperture angle A may be adopted, as required, however.

For a given width of the screening panels 13, that is to say for a given length of the crossmembers 38 of the chassis 35 of the screening panels 13, the number of projections 45 formed by the corresponding screening element 36 evidently depends on the aperture angle A of the projections 45.

This number may have any value, however.

In the embodiment shown in FIG. 7, each projection 45 is generally of half-sinusoid configuration.

In practice, these semi-sinusoidal projections 45 extend alternately towards the outside and towards the inside, so their overall configuration is that of a sinusoid.

The corresponding screening element 36 may be of perforated sheet metal, for example, as schematically shown in FIG. 7.

It is to be understood that the present invention is not limited to the embodiments described and shown, but encompasses any variant as to their execution.

Also, and as already mentioned hereinabove, its application is not limited to double flow chain screens, but extends equally to single flow (direct passage) chain screens and drum screens.

What I claim is:

1. A screen comprising a travelling endless screening band defining a loop and having a longitudinal direction of movement and including a plurality of screening panels connected to one another in succession substantially perpendicularly to the longitudinal direction of movement, each of said screening panels including a substantially plane chassis, and a screening element carried by said chassis, said screening elements forming relative to a general plane of said chassis part-cylindrical projections extending parallel to the longitudinal direction of movement, generatrices of the part-cylindrical projections being parallel to the longitudinal direction of movement, the improvement wherein the screen is adapted to filter water flowing from outside to inside the screen, and there are means for washing the screening band disposed inside the loop defined by said screening band in a position to preclude interference with movement of said screening band, said means for washing said screening band comprising a washing manifold spaced inwardly and beyond the path of movement of said chassis and lying generally perpendicular to the direction of movement, said washing manifold including a plurality of nozzles arranged in first and second rows staggered with respect to the direction of movement, a first plurality of said nozzles being directed at a first oblique angle relative to the general longitudinal plane of the screen and a second plurality of said nozzles being directed at a second oblique angle relative to said general longitudinal plane opposite the first oblique angle, whereby respective ones of said first and second pluralities of nozzles are in crossed relationship for washing respective surfaces of said projections.

2. A screen according to claim 1, wherein said washing manifold is disposed beyond the transverse contour of the screening panels.

3. A screen according to claim 1, wherein said first plurality of nozzles are arranged in one of said first and second rows of said second plurality of nozzles are arranged in the other of said first and second rows.

4. A screen according to claim 1, wherein said projections are of generally dihedral configuration.

5. A screen according to claim 4, wherein said screening element of a said screening panel forms a plurality of side-by-side part-cylindrical projections extending parallel to the longitudinal direction of movement, said chassis of said screening panels having two crossmembers extending perpendicular to the direction of movement, said screening elements being defined by a screening fabric, bars being disposed between said crossmembers of said chassis in parallel offset rows, the screening fabric running alternately around said bars of the respective offset rows.

6. A screen according to claim 4, wherein respective ones of said nozzles define an angle relative to each other which corresponds to the dihedral angle of the dihedral configuration of the corresponding said projection.

7. A screen according to claim 4, wherein said screening element of a said screening panel forms a plurality of side-by-side part-cylindrical projections extending parallel to the direction of movement, the half-sinusoidal projection extending alternately outwards and inwards to define a sine wave.

8. A screen according to claim 1, wherein said projections are generally of half-sinusoidal configuration.

9. A screen according to claim 1, wherein said projections are arranged side-by-side and parallel to the longitudinal direction of movement.

10. A screen according to claim 1, wherein said nozzles are oriented substantially normal to the respective surfaces of said projections.

11. A screen comprising a travelling endless screening band defining a loop and having a longitudinal direction of movement and including a plurality of screening panels connected to one another in succession substantially perpendicularly to the longitudinal direction of movement, each of said screening panels including a substantially plane chassis having spaced crossmembers perpendicular to the longitudinal direction of movement and a screening element carried by said chassis, said screening elements forming relative to a general plane of said chassis part-cylindrical projections extending parallel to the longitudinal direction of movement, generatrices of the part-cylindrical projections being parallel to the longitudinal direction of movement, the improvement wherein the screen is adapted to filter water flowing from outside to inside the screen, and there are means for washing said screening band disposed inside the loop defined by said screening band and positioned to preclude interference with the movement thereof, said means for washing the screening band comprising a washing manifold spaced inwardly and beyond the path of movement of said chassis and lying generally perpendicular to the direction of movement, said washing manifold including a plurality of nozzles arranged in first and second rows staggered with respect to the direction of movement, a first plurality of said nozzles being directed at a first oblique angle relative to the general longitudinal plane of the screen and a second plurality of said nozzles being directed at a second oblique angle relative to said general longitudinal plane.

12. A screen according to claim 11, wherein said first plurality of nozzles are arranged in one of said first and second rows of said second plurality of nozzles are arranged in the other of said first and second rows.

13. A screen according to claim 11, wherein said projections are of generally dihedral configuration.

14. A screen according to claim 13, wherein said screening element of said screening panel forms a plurality of side-by-side part-cylindrical projections extending parallel to the longitudinal direction of movement, said screening elements being defined by a screening fabric, bars being disposed between said crossmembers of said chassis in parallel offset rows, the screening fabric running alternately around said bars of said offset rows.

15. A screen according to claim 13, wherein respective ones of said nozzles define an angle relative to each other which corresponds to the dihedral angle of the dihedral configuration of the corresponding said projection.

16. A screen according to claim 11, wherein said projections are generally of half-sinusoidal configuration.

17. A screen according to claim 16, wherein said screening element of a said screening panel forms a plurality of side-by-side part-cylindrical projections extending parallel to the direction of movement, the half-sinusoidal projections extending alternately outwards and inwards to define a sine wave.

18. A screen according to claim 11, wherein said projections are arranged side-by-side and parallel to the longitudinal direction of movement.

19. A screen according to claim 11, wherein said nozzles are oriented substantially normal to the respective surfaces of said projections.

* * * * *